Aug. 11, 1931.  W. H. FITCH  1,817,979
AUTOMATIC TOURIST LOG
Filed June 24, 1930   2 Sheets-Sheet 1
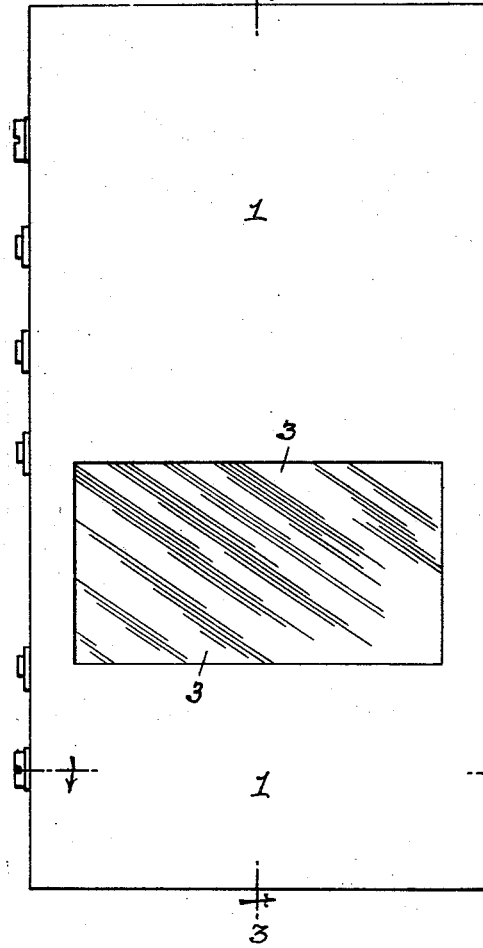
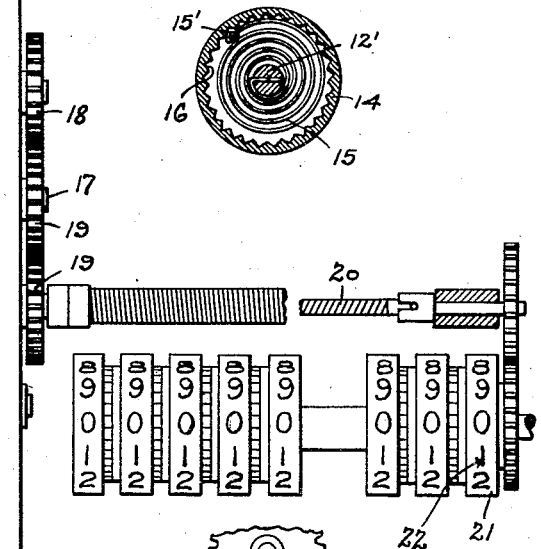
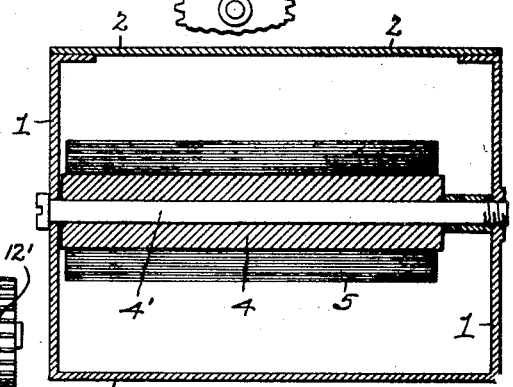
INVENTOR
BY W. H. Fitch
ATTORNEY

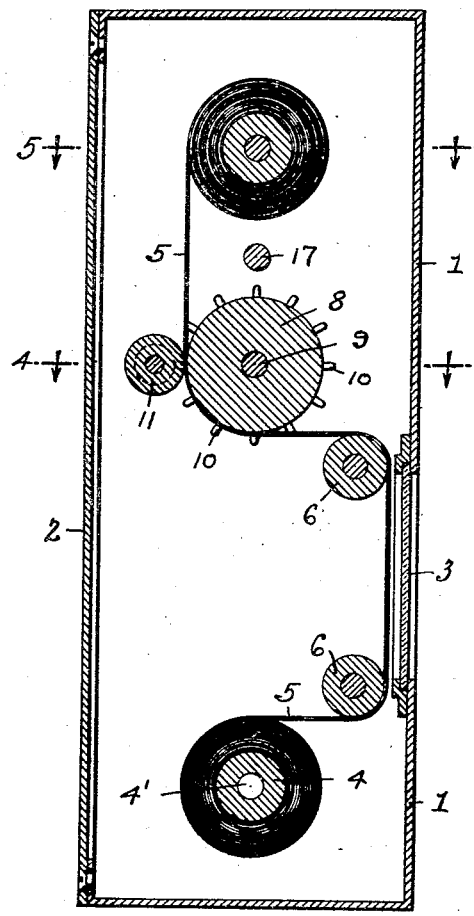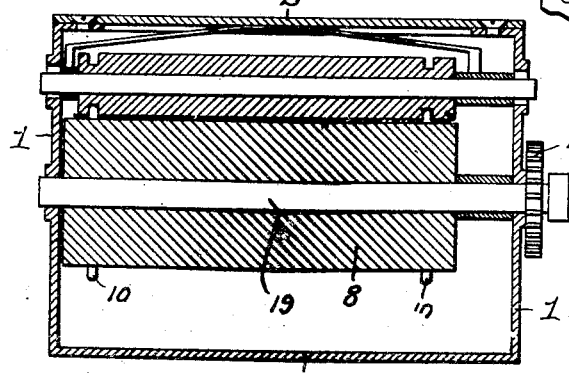

Patented Aug. 11, 1931

1,817,979

UNITED STATES PATENT OFFICE

WILLIAM H. FITCH, OF FORT WORTH, TEXAS

AUTOMATIC TOURIST LOG

Application filed June 24, 1930. Serial No. 463,500.

My present invention has reference to a new and novel road log for automobile tourists and my object is the provision of a simple device for this purpose which can be conveniently positioned in an automobile, automatically operated by a flexible connection to the speedometer or other part of the machine and which will reveal through a window in the casing of the device a sheet or curtain that moves at a predetermined rate in ratio to the speed of the machine, and which sheet has inscribed thereon the names of different places, points of interest in such places, accommodations to be obtained at such places, the direction which the driver is to take in traveling through such places en route and other valuable information, as well as the distance through such places and the distance between such places and other places to be encountered on the tour.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a view of an automobile log in accordance with this invention.

Figure 2 is a fragmentary side elevation thereof.

Figure 3 is a sectional view on the line 3—3 of Figure 1.

Figure 4 is a sectional view on the line 4—4 of Figure 3.

Figure 5 is a sectional view approximately on the line 5—5 of Figure 3.

Figure 6 is a sectional view approximately on the line 6—6 of Figure 5.

Figure 7 is a sectional view approximately on the line 7—7 of Figure 1.

Figure 8 is a fragmentary plan view of the log sheet of curtain.

As disclosed by the drawings I employ a substantially rectangular casing 1 of a small but desired size. The back 2 of the casing is removably connected to the body of the casing 1, the back proper of the body being open for the major portion thereof. The front of the body has removably arranged therein, at a suitable point adjacent to its bottom a transparent plate or window 3. The housing or casing 1 is designed to be fixed to the instrument board of the machine or at any desired convenient point therein in any desired or preferred manner so that the sheet or curtain providing the log can be observed by the driver as well, if desired, as by the occupants of the automobile.

Arranged transversely in the casing 1, adjacent to the bottom thereof, there is a roll 4. The roll has centrally passed therethrough a headed bearing pin or shaft 4'. The threaded end of the bearing pin or shaft 4' may engage with a nut arranged on the second side of the casing or may be threaded through an opening in the said side of the casing. The removal of the pin or shaft 4' permits of the removal of the roll 4.

The roll 4 has wound thereon a log sheet 5. The sheet is guided off the roll 4 over the outer faces of small rolls 6, respectively, that have their shafts or trunnions journaled in bearing openings in the side of the casing 1. These rolls 6 are arranged adjacent to the upper and lower edges of the window 3 so that the log sheet can be clearly observed through the window. The log sheet, adjacent to its edges, is provided with series of equidistantly spaced apertures 7, and the distance between these apertures is such that the sheet 5 will move a predetermined distance in accordance with each mile traveled by the automobile.

Above and inward of the upper roll 6 there is a larger roll 8 whose shaft 9 is journaled in openings in the sides of the casing 1. This roll, adjacent to its ends, is provided with peripheral teeth 10 to engage in the apertures of the sheet 5. At the rear of the roll 8 and exerting a slight pressure against the said roll 8 there is journaled in the casing a smaller roll 11. The roll 11 is in the nature of a presser roll and insures the teeth of the roll 8 properly engaging in the apertures of the log sheet 5, so that the said teeth will have perfect mesh with the holes in the log sheet, which is preferably constructed of tough paper, which will prevent the tearing of the said log sheet. Also the roll 11 holds the sheet in perfect alinement and adjusts itself on the roll 8 between the teeth 10 thereof. The roll 11 is peripherally provided with annular grooves that receive the teeth 10 of the roll 8 therein, and preferably the trunnions of the roll 11 are spring influenced against the log sheet 5 so that the roll 11 becomes an actuating roll as will presently be understood. The sheet receiving roll is arranged above the roll 8 and is indicated by the numeral 12. The shaft for the roll 12 has one end headed and is in the nature of a removable member. The shaft 13 is screwed in a stub shaft 12' which is journaled through one end of the casing and to whose outer end the stub shaft has fixed thereon a gear 18 arranged adjacent one side of the casing. Arranged around the stub shaft 12' there is the cylindrical housing 14 for a coiled spring 15 that has one end fixed on the stub shaft. The inner and closed face of the housing 14 is provided with pins 14' that enter suitable openings in the end of the roll 12 adjacent to the said housing. The outer or free end of the coil spring is bent upon itself or otherwise formed with a lug or hump 15' designed to engage with teeth 16 on the inner face of the housing 14. This is one of the important features of the invention as the compensating spring 15 which is loose in the housing 14 will take care of the decreasing speed at which the receiving roll revolves, while were the spring fixed to the housing and the machine having traveled a long distance it will wind up all of the spring and thus cause the receiving roll to become a rigid one but by leaving the outer end of the spring loose and forming the same with a lug to engage with the teeth in the housing the lug end of the spring will slip sufficiently to unwind to where it will not operate.

The compensating spring takes up all slack in the log sheet after it passes between the rolls 8 and 11 and the roll 12 is prevented from traveling too fast by the teeth 10 on the roll 8 which engage in the apertures 7 of the sheet 5 so that the said sheet 5 cannot travel any faster than the roll 8, and the gear element, hereinafter described, being stronger than the "pull" of the spring 16 and furthermore the roll 8 being directly connected with the speedometer as will also presently be described cannot travel any faster than its ratio to the speed of the automobile.

Between the shafts 9 and 13 there is journaled transversely through the casing 1 another shaft 17. The outer end of this shaft 17 as well as the outer end of the shaft 9 has fixed thereon intermeshing gears 19, respectively, which also mesh and the gear on the shaft 17 meshes with the gear 18.

The shaft 9 has its outer end, which projects beyond the gear 19 connected to a flexible shaft 20. The flexible shaft 20 is in turn connected to the shaft for the mile disc (divided into 10ths) of the speedometer and the mile recorder or odometer of the speedometer turns the shaft 20 and a wheel 21 on said shaft 20 inscribed with 10th mile figures or indications 22 that make a complete revolution each mile and for each complete revolution it makes it revolves the disc adjacent to it one-tenth of a revolution or one mile. However, as the speedometer constructions vary the shaft 20 is to be attached to the proper speedometer mechanism and shaft to actuate log mechanism at the speed above indicated.

The log sheet 5 is divided into blocks in each of which is inscribed the places, towns or cities to be passed by the tourists and also the places of interest in such towns together with data relative to stopping points at such places, paths to be taken by the tourists passing through such places and other information of great value to the tourist. Thus the tourist is given printed information about hotels, garages, tourists' camps and the like just a short distance before the car arrives at that particular place.

The flexible shaft 20 is connected to the speedometer in such a way that the mile disc of the speedometer and log sheet 5 of my improved automatic log can be set at zero at desired places in cities and towns. The reason for this is that in starting a trip, the trip mechanism of the speedometer and the log sheet are to be set together at zero and if one stops in a city before reaching his destination and drives around the city, he disconnects the shaft from the automatic log and when he is ready to resume his trip he sets the speedometer with the left hand figures on the curtain or sheet so that the speedometer and log sheet continues to operate together.

As above stated, valuable data is set forth on the log sheet and readable through the window 3 without inconveniencing the driver of the automobile. One block of the log sheet, for instance, may have inscribed thereon "Go south on Main Street to depot (1 mile); turn left and follow car line straight ahead one mile; leave car line to right and go down hill and you are on highway No. 1." This and like information will leave no doubt in the tourist's mind as how to get out of the city onto any logged highway he wishes to travel. The improvement also is advantageous inasmuch as the log sheet discloses on one of its margins the distance to the end of the logged trip, and, of course, the distance and names of the intervening towns in front of the tourists as well as the highway number to be followed, so that if there is a highway leading off it is impossible for him to go wrong. If his trip necessitates his changing from one highway number to another the log sheet may have such different highway numbers inscribed thereon. The log sheet not only discloses the distance between stations but the distance from beginning to the end of the tour and the distance between the stations that are passed on the tour.

The improvement is not to be considered in the nature of a road map and the same comprises only a few simple parts which are not liable to breakage or disorder. The log sheet can be readily removed from the rolls or placed thereon by unscrewing the back 2 from the body of the casing or by providing the casing with a hinged or movable front and likewise discloses to the driver of the machine the points of interest, the highways to be taken, etc., but has marginal figures 23 and 24 to denote the distance one has traveled, the distance to the end of the logged trip and the distance to intervening towns.

Having described the invention, I claim:

1. A route log for automobiles, in which the automobile is provided with a speedometer, and comprising a casing having a window in one face thereof, a roll journaled in the casing around which a log sheet is wound, rolls in the casing adjacent to the top and bottom of the window guiding the log sheet, said log sheet having equidistantly spaced apertures throughout its length adjacent the edges thereof, a toothed wheel in the casing having its teeth engaging the apertures, a roll in the casing on which the log sheet is to be wound, a shaft freely journaled through the roll, a coil spring between the shaft and the roll, and a flexible shaft connected with an element in the speedometer for rotating the toothed wheel in timed relation with the speed of the automobile.

2. A route log for automobiles in which the automobile is provided with a speedometer and comprising a casing having a window in one face thereof, a roll journaled in the casing around which a log sheet is wound, rolls in the casing adjacent to the top and bottom of the window guiding the log sheet, said log sheet having equidistantly spaced apertures throughout its length adjacent the edges thereof, a toothed wheel in the casing having its teeth engaging the apertures, a roll in the casing on which the log sheet is to be wound, a shaft freely journaled through the roll, a coil spring between the shaft and the roll, and a flexible shaft connected with an element in the speedometer for rotating the toothed wheel in timed relation with the speed of the automobile and a mile indicator operated by said flexible shaft.

3. A route log for automobiles, in which the automobile is provided with a speedometer and comprising a casing having a window in one face thereof, a roll journaled in the casing around which a log sheet is wound, rolls in the casing adjacent to the top and bottom of the window guiding the log sheet, said log sheet having equidistantly spaced apertures throughout its length adjacent the edges thereof, a toothed wheel in the casing having its teeth engaging the apertures, a roll in the casing on which the log sheet is to be wound, a shaft freely journaled through the roll, a coil spring between the shaft and the roll, a flexible shaft connected with an element in the speedometer for rotating the toothed wheel in timed relation with the speed of the automobile, a presser roll to the rear of the toothed wheel, a pinion on the shaft for the toothed wheel, an idler pinion meshing therewith, a pinion on the shaft for the log sheet receiving roll in mesh with the last mentioned pinion, a flexible shaft hitched to an element in the speedometer and connected to the pinion on the shaft of the toothed wheel and a mile indicator operated by the flexible shaft.

4. A route log for automobiles, in which the automobile is provided with a speedometer, comprising a casing having a window in the outer face thereof, a roll journaled in the casing around which a log sheet is wound, a removable shaft for the roll, rolls in the casing adjacent to the top and bottom of the window, affording guides for the log sheet, said log sheet having equidistantly spaced apertures throughout its length adjacent the edges thereof, a toothed wheel journaled in the casing and the teeth thereof engaging the apertures in the log sheet, a presser roll for forcing the sheet against the toothed wheel, a roll journaled in the casing on which the log sheet is to be wound, a removable shaft for the roll, a stub shaft journaled in one side of the casing in which the movable shaft is screwed, a cylindrical housing on the stub shaft, having pins received in openings in the log sheet receiving roll, said housing having its inner periphery provided with teeth, a coil spring fixed on the stub shaft, received in the housing and having its outer end formed with a lug to engage with the teeth, a gear on the outer face of the housing, a gear on the shaft of the toothed wheel, an idler gear between the said gears intermeshing therewith and a flexible shaft connected with an element in the speedometer for rotating the toothed wheel in timed relation with the speed of the automobile.

In testimony whereof I affix my signature.

WILLIAM H. FITCH.